Jan. 31, 1967  H. W. KUMMER  3,301,039

SKID RESISTANCE DRAG TESTER

Filed Jan. 6, 1964  2 Sheets-Sheet 2

INVENTOR

HARTWIG W. KUMMER

BY Browne, Schuyler & Beveridge

ATTORNEYS

United States Patent Office 3,301,039
Patented Jan. 31, 1967

3,301,039
SKID RESISTANCE DRAG TESTER
Hartwig W. Kummer, State College (University Park), Pa., assignor to The Pennsylvania State University, University Park, Pa.
Filed Jan. 6, 1964, Ser. No. 335,745
12 Claims. (Cl. 73—9)

This invention relates generally to measurement of a surface characteristic such as roughness or coefficient of friction and more particularly to method and apparatus for rapidly determining the skid resistance of a surface when contacted by a test surface of specified characteristic under a standard loading condition.

Particularly in the field of highway safety specifications, it is desirable to measure and classify conditions of a road surface with respect to the degree of skid resistance which these surfaces present to the wheels of passing vehicles. Similarly, other surfaces such as factory floors which require antiskid properties must be measured and classified to determine compliance with specifications or with safety standards. Obviously, many conditions must be met in the measurement of such surfaces and in the calculation of an index such as a coefficient of friction, whether in absolute terms or in terms of safety factors employed in computing safe speed limits. Other characteristics of a road surface may require different measurement, but this invention will be described with particular reference to the use of a portable tester and a method which might be employed locally in determining whether the surface of a highway meets acceptable standards, or in determining when the condition of an intersection makes it necessary to resurface the road in that locality to comply with reasonable standards of safety. Various weather conditions may also make it important that a standard measurement be readily available for determining safe speed standards or liability for negligent use of the highway. Similar questions of liability may rise in connection with working and walking surfaces where a hazard is presented.

Means for measuring skid resistance or slipperiness of pavements have been known heretofore for use in the laboratory and for spot checking of isolated spots on a highway or other surface to be examined. A second type of skid resistance testing device is designed for use while traveling along a highway at relatively high speed. The laboratory-type tester, when adapted for use outside, involves detailed close inspection and the use of carefully adjusted pendulum measurements, and the like. The high speed trailer type of highway inspection device is generally not suitable for use in localized areas such as slippery spots associated with intersections and unusual positions of wear. Whenever it is necessary to make a measurement on a slope or a curve or to measure large areas where the laboratory tester is unsuitable and the high speed road tester cannot be used, a suitable direct-reading device has not been previously available, nor have methods been known for rapidly determining the coefficient friction or the skid resistance index which is desirable for the purpose.

It is accordingly an object of this invention to provide a high speed method of measuring the coefficient of friction between two surfaces.

Another object of the invention is to provide for rapid measurement of skid resistance on sections of highway which are neither level nor straight.

A further object of the invention is to provide apparatus for measuring a skid resistance index rapidly and without interfering with road traffic.

A still further object of the invention is to provide apparatus for measuring a standard index proportional to the coefficient of friction between two surfaces averaged over a considerable distance and a variety of conditions.

Other objects and advantages of the invention will become apparent as the description proceeds in connection with an illustrated embodiment thereof in which:

FIG. 5 is a diagrammatic showing of a handle for use with the device of FIG. 1.

A coefficient of friction measuring device and method according to this invention basically employs a two-wheeled cart having suspended from common rotational axis thereof one end of the device forming a load of determined magnitude, the other end thereof being carried on a shoe having a surface or edge bearing against the surface to be measured in accordance with a suitable loading factor. Skid resistance measurement is made by advancing the wheeled cart in one direction by means of a handle so mounted that the cart axle carries the supported end of the load smoothly at a position adjacent the surface. Movements of the handle are not permitted to exert substantial accelerating or lifting forces on the measuring device.

The shoe is surfaced with a test material such as rubber like that of the tread of a tire for which it is desired to determine the coefficient of friction with respect to the surface tested. By suitable loading and calibration, an operator merely walks along pushing the device with the shoe in contact with the surface to be examined. This produces rearward thrust along a longitudinal shaft on bearings in a housing to be nearly without friction. This thrust operates on a highly flexible diaphragm forming one wall of a hydraulic chamber filled with a liquid and communicating with a pressure dial, preferably modified in accordance with various uses of this invention.

Figure 1:
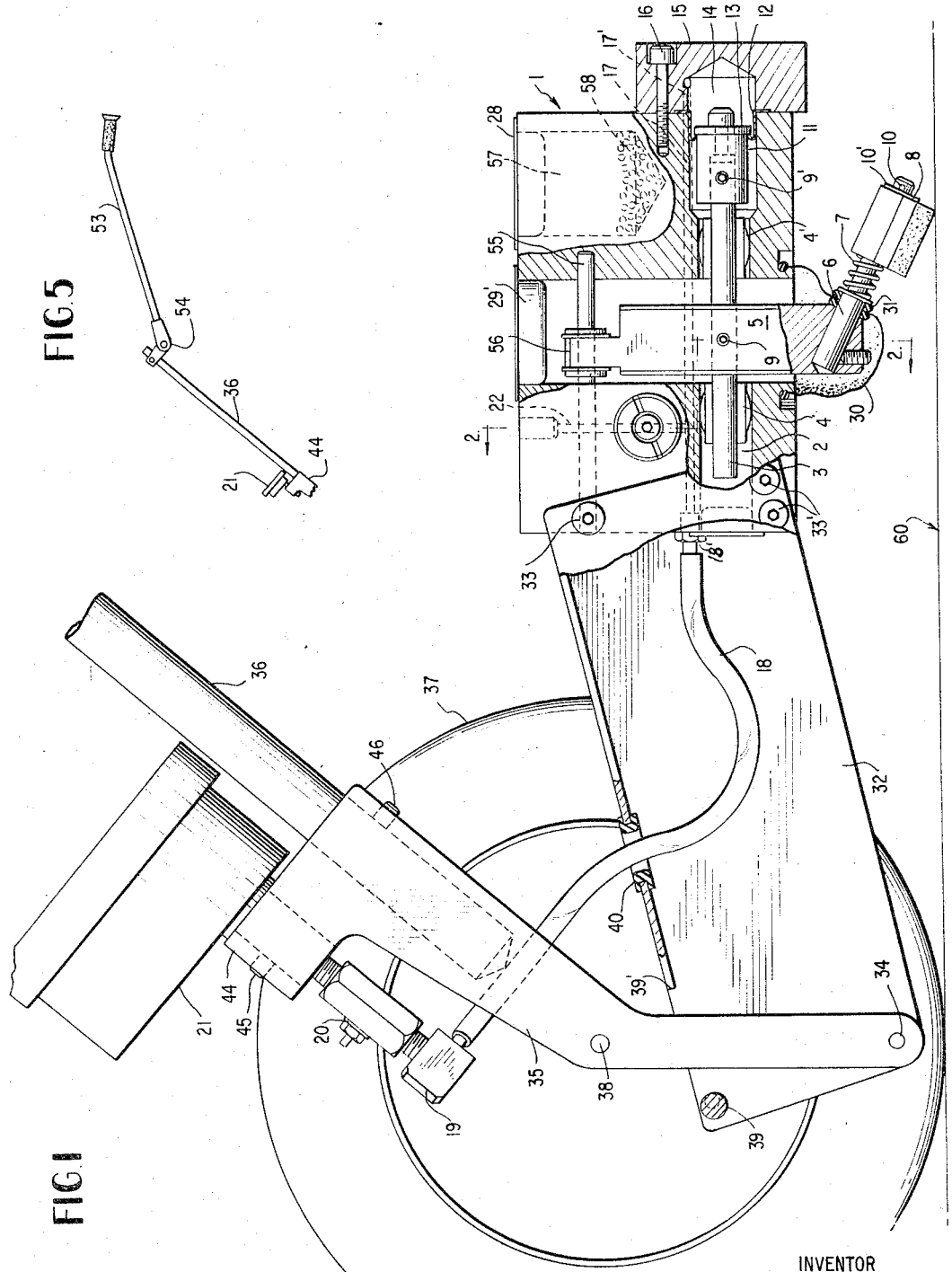
FIG. 1 is a side elevation, partly broken away, of a device according to this invention.
Figure 2:
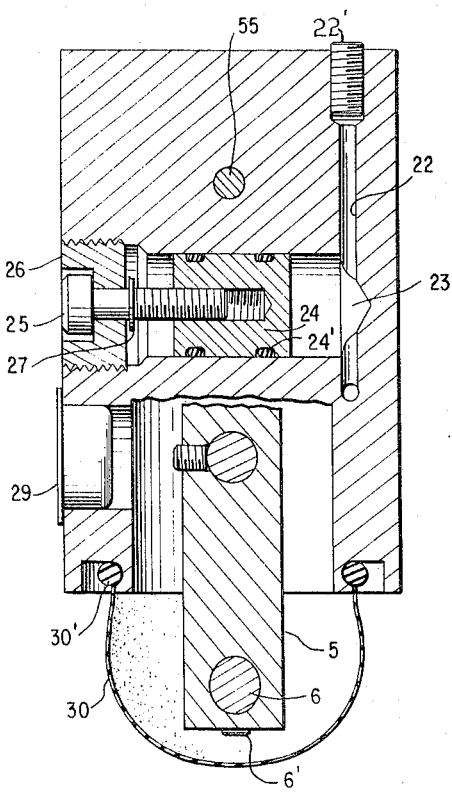
FIG. 2 is a sectional view taken along the line 2—2 of FIG. 1.

Referring now to FIG. 1, a mechanism to carry out the method of this invention includes means for translation of the force necessary to move a loaded shoe along the tested surface into an hydraulic pressure. This pressure is shown as a dial reading and the calibration of the dial may be in units of coefficient of friction, or other calibrations as may be appropriate to the particular test.

Housing 1 is illustratively formed from a block of aluminum having a longitudinal bore 2 therein fitted with a longitudinal shaft 3, preferably of hardened steel, borne on ball bushings 4 and 4' to slide freely in the fore and aft direction within the bore 2. Coupled to shaft 3 is a connector 5 fixed preferably at right angles thereto riding within the central aperture in the housing 1 and arranged to be vertically oriented by means of a second shaft which, according to one version, actuates the hydraulic pressure apparatus, but is here illustrated as actuating the hydraulic apparatus directly by way of shaft 3. Connector 5 carries at the lower end thereof a slider support or friction shoe-bearing element 6 which may be in the form of a shaft. Member 6 is secured to the connector by set screw 6' to extend rearwardly therefrom preferably at a downward angle to bear slider shoe 8 which contacts the test surface. Shoe 8 is positioned from connector 5 preferably by a recoil spring 7 which urges the sleeved shoe along shaft 6 toward the outer end thereof in a position to contact the tested surface. Shaft 6 may be fitted with a pin 10 and washer 10' to limit movement of the shoe under urging of spring 7.

Shaft 2 may be fixed to connector 5 as by a set screw or pin 9 passing therethrough and by means of a set screw or pin 9' is attached to hydraulic piston 11 which is within bore 2 or an enlarged extension thereof as may be desired, and to have an exposed end area forming one wall of a hydraulic chamber. This wall is preferably completed by means of a highly flexible bellows or rolling type diaphragm in the form of a closed rubber sleeve illustrated at 12. Diaphragm 12 may be connected at piston 11 by means of a retaining lip or seal 13 suitably connected to the end of piston 11. Diaphragm 12 and seal 13 thus complete a movable wall of pressure chamber 14 which has thereon cap 15 secured to housing 1 by a number of bolts or screws 16 (one being shown) adapted to compress the edge of the diaphragm 13 between cap 15 and housing 1. Chamber 14 communicates with pressure channel 17 bored within the housing 1 by way of bored channel 17'. At the opposite end of channel 17 is connected hose 18 by means of suitable nipple 18' securing the hose to the housing 1. Flexible transparent plastic tubing may be employed as hose 18, except that a plastic having very little stretch is preferable to avoid excessive resilience in the hydraulic line, according to conventional practice. Tube 18 connects to a suitable fitting 19 through a constriction, preferably an adjustable damping valve 20, to a pressure gage or meter 21. A measurement of instantaneous pressure in the chamber 14 is obtained, and this pressure varies with the longitudinal force on diaphragm 12 exerted by the skid resistance of the surface under test as shoe 8 is slid forward.

A skid resistance tester for general utility preferably has means of compensating for temperature changes so that it may be employed under variable conditions of sun, wind and rain, thereby requiring that the hydraulic chamber and its connecting tubing have a volume adjustment according to temperature. In one aspect of the invention it is furthermore desirable that the compensated hydrostatic pressure within the chamber be varied to facilitate measurement under certain conditions. As an example, it may be desirable that a skid resistance of a certain range of magnitudes being repeatedly measured have a fixed maximum value and a calibrated rate as meter 21 responds to increasing pressure as the shoe 8 is moved along a test surface 60. It may be desirable to statically load the pressure chamber to produce a desired zero meter reading and, as longitudinal force on shaft 2 increases, a calibrated reading in a desired range proportional to force on shaft 2. Additionally, when fluid is lost from such a pressure chamber it would change the calibration as well as the zero point. It is also required that the pressure system be maintained full of liquid at all times.

Housing 1 is accordingly fitted with a vertical bore 22, closable by a screw closure 22', connecting with the bore 17 and with a chamber 23, formed in housing 1 as a cylindrical bore. Compensator piston 24 fits therein and is sealed as by O-rings 24' to vary the volume of the chamber 23 by adjusting screw 25, held within a threaded plug 26 by snap ring 27 while threadedly engaging piston 24. Rotation of screw 25 in a counterclockwise direction, as it is illustrated, moves piston 24 to the right thereby decreasing the volume of compensating chamber 23. Clockwise rotation increases the volume of chamber 23, as might be necessary to maintain a fixed hydraulic head to compensate for rising temperature and keep the resting point of the meter at the meter zero. It will be evident that any adjustment of screw 25 produces a corresponding change in the dial reading on meter 21 under conditions of rest when shoe or slider 8 is not operative to vary the pressure.

Housing 1 is preferably fitted with access openings for adjustment and assembly of the apparatus, which openings are preferably closed during use as by ballast plug 28 and access plugs 29 and 29'. Connector 5 extends vertically below the housing to receive shaft 6, and sealing membrane 30 is fastened to housing 1 by retaining ring 30' having an opening therethrough receiving grommet 31 closely fitted around shaft 6 in a manner to permit connector 5 to move fore and aft without restraint by the flexible sealing cover 30.

At the forward end of housing 1 a pair of side panels 32 of suitable rigid material constitute an extension of the housing being secured thereto and aligned therewith by screws 33 and 33' to support the forward end of the housing on pivot 34, formed in the extension of a handle extension or casting 35. Casting 35 receives handle 36 and is borne on cart wheels 37 by means of pivots 38 which form a supporting axis for the front end of the mechanism load. Handle 36 and extension 35 are offset to provide a handle extending backwardly past the rear end of the housing 1 while maintaining pivot 34 essentially beneath pivots 38 centered in wheels 37. Base wheel 37 may be of any simple commercial structure having thereon a tire of smooth tread characteristic. During use a portion of handle extension 35 is substantially vertically below pivots 38 and provided with an opening permitting the fitting to pivot through a substantial arc between an adjustable eccentric spacer 39 and a stop portion 39' attached to side panels 32. Grommet 40 conveniently receives tube 18 to position it with respect to fitting 19 adjacent gauge 21.

Figure 3:
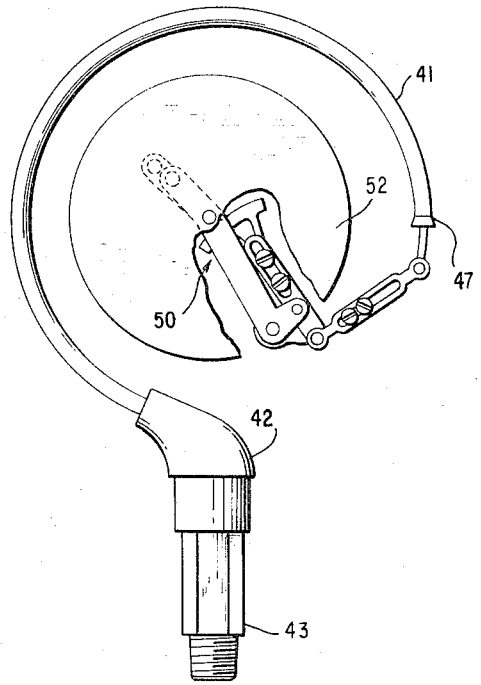
FIG. 3 is a schematic diagram of a gage illustratively employed with this invention.
Figure 4:
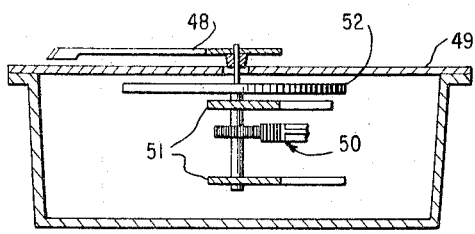
FIG. 4 is a sectional view of the gage according to FIG. 3 showing the damping disc therein.

The gage employed for measurement of the pressure within the chamber 14 may be one of several well known types, such as a bellows gage, since the pressure employed will generally be well within the range of such gages. Alternatively, a Bourdon tube may be formed in an arc as illustrated at 41 of FIG. 3 and carried on a base 42 connecting with fitting 43 and needle valve 20 or fitting 19, and may threadedly engage a receiver portion 44 attached to handle fitting 35. A screw clamp 45 or other suitable arrangement may fix the position of fitting 43 within receiver 44 and a set screw or other clamping device such as 46 may secure handle 36 within the same receiver 44.

As illustrated, Bourdon tube 41 has a free end or actuator portion 47 which may adjustably engage and actuate pointer 48 moving over dial 49 of the meter or gage within a housing 50 carried on bearings 51.

In the use of a skid resistance testing device of the character thus disclosed, it will be normal for an operator to move along at a steady walking speed, preferably to test a substantial distance along a road surface between oncoming vehicles. It is also noted that a resilient system such as this tends to develop resonant characteristics and pointer 48 may oscillate widely. To avoid oscillation of the pointer 48, damping disc 52 is secured concentrically to the shaft carrying pointer 48 having a sufficient mass to average out or damp small rapid impulses tending to set the pointer 48 into vibration.

Handle 36 is illustrated as extending rearwardly to a position above or behind the housing 1 but is preferably further supplied with the handle extension 53 having an adjustable elevation secured to the handle portion 36 by a clamping arrangement 54 of suitable design.

Apparatus as heretofore described may be varied in a number of aspects without departing from the operative principles now apparent. For example, piston 11 may be carried on shaft 3 as described, or may be carried on an auxiliary shaft connected thereto by a rigid fixture or by connector 5. An auxiliary shaft illustrated at 55 is of hardened steel and is carried in a suitable bore above shaft 3. Connector 5 may be arranged as illustrated to ride along shaft 55 without restraint thereby inasmuch as ball bushing 56 may be connected to connector 5 and may ride on the shaft 55. It is also convenient to vary the weight of the housing 1 and thereby the pressure applied to shoe 8 in contact with surface 60 and for this purpose a ballast chamber 57 is supplied into which may be inserted ballast shot 58.

Shoe 8 as described may take a number of shapes for friction measurement and may be faced with different materials according to the coefficient to be measured. To measure sliding friction between a wooden floor and objects placed thereon the floor would comprise surface 60 and shoe 8 would be faced with wood having a characteristic configuration and loading in accordance with the measurement to be made. A table leg having end grain exposed would have a corresponding configuration on the face of shoe 8. In illustrating use of skid resistance for pavements a rubber facing is placed on shoe 8 constructed to have a loading per square inch of contacting surface related to the loading of a vehicle wheel and may exhibit edge effects comparable to those of tire treads normally employed in contact with the road surface. By experiment it is found that a rubber faced metallic shoe of three to five inches width may be disposed with one edge riding against the surface 60 at a considerable angle such as 30° to simulate those conditions where the tire tends to override successive humps and hollows of the textured surface comprising the roadway. Such a shoe is found to have considerable durability before the exposed edge is worn sufficiently to greatly change the friction as measured in the force required to move the shoe along under the specific loading selected. This durability depends obviously on the roughness of the surface and the hardness of the facing material on the shoe as well as on the specific loading. Rubber material of the type employed in tires under a total loading on the shoe of four to seven pounds has a typical durability of 1500 feet without appreciable change in the measured skid resistance.

In highway testing it is desirable to measure skid resistance under adverse circumstances. Temperature and humidity have a bearing on the coefficients and upon the total skid resistance for a given loading. Adverse summer time conditions are approximated by first wetting down the surface and then performing a drag test thereover at normal walking speed of approximately three miles per hour. Since temperature is a variant somewhat affecting the results, but in a regular way, the temperature is normally noted and a correction therefor is made prior in the calculation of the resulting coefficient. The slope of the road surface also has a bearing and a correction therefor is made according to usual mechanical calculations involving the sine of the angle of inclination. Where the slope is appreciable, a change will also be apparent in the relative height of the gage above the pressure chamber, and a correction proportional to the cosine of the angle with respect to the vertical may be made according to well known engineering practice. There is also a correction for the gage height, but this is made in the pointer zero adjustment since it is constant.

A manually pushed cart of the type illustrated undergoes acceleration increasing and decreasing with respect to the steady rate during each step of the operator. This causes a fluctuation in the pressure, but a constriction in the line by needle valve 20 is effective to damp out this spurious effect.

The coefficient of friction measured may be expressed as $f=F/L$, where F is the force required to cause the slider to slip on the surface and L is the load thereon in suitable units. The pressure in chamber 14 resulting from skid resistance F will be $F=A.p$ where A is the effective area of the transducer and $p$ is the pressure in the hydraulic system resulting from force F. Obviously, these two equations combine to provide $f=p.A/L$ as a measure of the coefficient of friction or an index figure for skid resistance, calibrated in the most convenient units for the particular application. Exact calculation is simply made according to well known theory, for example, L may be measured on a conventional scale or balance by lifting the shoe 8 from the surface, shaft 3 being horizontal, and a fine tension line may be employed with a pulley and weight arrangement to measure F at which a particular scale reading is reached, calibrating the dial 49 with respect to movements of pointer 48 for specific values of force F. After the device is designed and assembled A is constant and known and enters into the gage reading as a calibrated pressure. Since the loading factor is easily changed to provide a standardized calibration, it is convenient to change the load to provide appropriate dial divisions in terms of force F. This is readily done by increasing or decreasing the ballast loading in chamber 57. For many purposes it is desirable to have a coefficient of friction reading in percentage points by selection of L or F to provide a ratio of unity at full scale deflection of pointer 48 and to calibrate the dial in terms of 0 to 100. Pressure in terms of $p$ then has a correction factor applied as a dial zero setting since the actual pressure at the gage 21 is not the pressure in the chamber 14 but takes into account elevation differences.

A method and apparatus for measuring coefficients of friction by sliding a weighted slip shoe along a test surface has been described and illustrated with respect to an embodiment for road surface testing, but the invention may be practiced otherwise than as specifically disclosed and described, and it is intended to include equivalent method and apparatus within the scope of the appended claims.

What is claimed:
1. Apparatus for measuring roughness in local areas of a surface, comprising
   a housing supported at one end adjacent said surface by a wheeled cart, being journaled at points substantially below an axis of rotation for the wheels thereof,
   a longitudinal slide member mounted in substantially frictionless sliding engagement relative to said housing,
   a shoe supporting a second end of said housing in sliding frictional engagement with said surface being linked to urge said member longitudinally relative to the housing in proportion to a force sufficient to slide said shoe on the surface,
   manually operated means for applying a force proximately to said surface for translating said housing along the surface at a substantially uniform rate,
   a closed hydraulic pressure chamber,
   horizontal shaft means coupling said member to increase said pressure in proportion to said force as the shoe is translated, and
   a gage registering changes of pressure in said chamber.

2. Apparatus according to claim 1 wherein said means for translating said housing includes a manual driving handle nonrigidly joined to supporting means for said one end of the housing, whereby translating force at said handle is communicated to said housing, and said housing is journally supported from said handle substantially independently of handle elevational changes.

3. Apparatus according to claim 1 further including a second shaft supported in said housing and having a movable bearing slideable parallel to said slide member, said bearing and slide members being linked together to support said housing relative to said shoe during longitudinal motion with respect to the housing.

4. A manually operated drag testing device, comprising:
   a two-wheeled cart for supporting said device at one end thereof,
   manual drive and control means for said cart,
   support means including a pair of pivot points defining a transverse axis substanttially beneath wheel axis of said cart,
   a housing pivoted at one end for support at said transverse axis and extending horizontally rearward therefrom,
   a shaft longitudinally reciprocable in said housing,
   a support fixture rigidly attached to said shaft,
   a linear shoe having a lower exposed edge parallel to said axis and extending from said fixture for supporting contact with a surface to be tested,
   a hydraulic piston coupled to said shaft,
   a hydraulic line including a chamber compressible by longitudinal motion of said shaft,
   a gage hydraulically coupled to said chamber to register as a pressure change frictional forces resulting from movement of said shoe on said surface.

5. A device according to claim 4 including load adjustment means calibrating said gage in relative resistance of said shoe to slippage on said surface.

6. A device according to claim 4 including a variable constriction in said line to average out pressure and gage reading variations over variable periods of oscillation.

7. A device according to claim 4 including damping means to stabilize the gage reading over periods of mechanical vibration.

8. A device according to claim 4 wherein said shoe includes a facing of rubber for contact with said surface along a predetermined width of travel, said facing being of character comparably related to vehicle tires.

9. Apparatus for measuring the coefficient of friction between a generally horizontal surface and a contacting surface of predetermined character, comprising
    a housing structure supported uniformly at one end above said horizontal surface,
    shoe means including a narrow resilient bearing edge constituting said contacting surface,
    longitudinally slidable shaft means supported by said shoe means being mounted on said structure for support of a second end thereof,
    freely movable piston means coupled to said shaft means for movement therewith,
    hydraulic means coupled to said piston means to generate pressure in proportion to frictional resistance to horizontal slippage between said surfaces,
    pressure indicator means calibrated in frictional units actuated by motion of said piston when said shoe is transversely translated on said surface, and
    means for variably loading said structure to provide indicator actuation in proportion to the effective coefficient of friction between said surfaces.

10. Coefficient of friction apparatus according to claim 9 wherein said piston means has an effective area A, said means loading the structure produces a load L on the shoe means, said gage is calibrated in percentage units of the force F required to induce said slippage by the formula $f=p.A/L$, where $f$ is said coefficient and $p$ includes pressure correlation constants.

11. Pressure gage apparatus for indicating the coefficient of friction $f$ between first and second surfaces according to the relation $f=p.A/L$ where $p$ is the variation of pressure in a hydraulic line at the gage, L is a static loading effective between said surfaces and A is effective area of a diaphragm exerting variable pressure in said line, the first surface being of variable coefficient, comprising
    a shoe bearing a said second surface of fixed character in contact with the said first surface,
    means for loading said shoe normally to the first surface,
    coupling means for conveying to said shoe a driving force sufficient to slide said second surface in frictional contact along the first surface,
    means applying said force to said line over an area A to increase the pressure therein proportionally to the sliding friction between said surfaces,
    pressure gage means connected for actuation by said increase of pressure, being adjusted for zero reading when said force is zero, and
    means fixing said loading to a value L to provide a predetermined gage indication of pressure $p=l$ corresponding to $f=l$.

12. The method of standardizing measured conditions of a traveled surface which comprises
    urging against said surface a resiliently contacting shoe with a known force,
    sliding said shoe tangentially along said surface by a second force,
    translating said second force into a hydraulic pressure proportional thereto,
    registering said pressure as a dial reading of the ratio between said known and said second force,
    adjusting said dial to a zero reading when said second force is zero, and
    adjusting said ratio by varying said measured force to provide a standard dial reading for a predetermined value of said second force.

References Cited by the Examiner
UNITED STATES PATENTS

| | | | |
|---|---|---|---|
| 2,496,405 | 2/1950 | Foufounis | 73—9 |
| 2,700,297 | 1/1955 | Allen | 73—9 |

DAVID SCHONBERG, *Primary Examiner.*